Feb. 8, 1944.        P. L. WORMELEY        2,340,852
MEANS FOR CLAMPING A HOSE AND COUPLING
Filed Sept. 30, 1942

P. L. Wormeley
INVENTOR.
BY

Patented Feb. 8, 1944

2,340,852

UNITED STATES PATENT OFFICE 2,340,852

MEANS FOR CLAMPING HOSE AND COUPLINGS

Philip L. Wormeley, Washington, D. C., assignor of one-half to Otto E. Fearn, Washington, D. C.

Application September 30, 1942, Serial No. 460,254

2 Claims. (Cl. 285—84)

This invention relates to a method of and means for clamping a hose to a hose coupling.

It is essential that a hose be securely attached to the coupling so as to prevent separation of the parts when subjected to high pressure of water such as used for example in fire hose. Heretofore, in order to join the parts, it has been the practice generally to utilize an expansion sleeve formed of brass. This sleeve has been inserted into that end of the hose located within a coupling member and thereafter, by the use of an expanding tool, the sleeve has been enlarged or expanded so as to force the hose into intimate contact with the surrounding coupling member and to clamp it so tightly as to prevent accidental separation of the parts.

Under present war conditions the use of brass may be prohibited and, for that reason, manufacturers of hose and hose couplings are desirous of providing a means whereby, without changing the design of the coupling members, the hose can be properly held in place without the use of brass.

An object of the present invention is to provide a ring which can be made of brass or other materials in which the stretch can be avoided or held to any predetermined amount, thereby eliminating the weakness that has heretofore occurred in the application of an ordinary expansion ring which must be stretched to such an amount that frequent breakage results, or which even if stretched to the desired diameter, will be reduced in section and will retain only a fraction of its original strength.

An object of the present invention is to provide a clamping ring or sleeve so shaped that it can be formed of brass or other material, which might be a ferrous metal and, when applied, will firmly grip the hose at all points, will be maintained at a uniform thickness throughout, will have no undesirable "set back" and will not buckle or otherwise become distorted after application.

A still further object is to provide a sleeve or ring of this type which can be made with a protective coating to prevent rust, the act of applying the ring being accomplished without cracking or otherwise mutilating the coating, thereby leaving the ring or sleeve in such a condition that it will not be affected by moisture.

With the foregoing and other objects in view which will appear as the description proceeds, the invention resides in certain novel details of construction and combinations of parts and in certain new and novel steps in the method hereinafter more fully described, it being understood that changes may be made in structure and in the method followed without departing from the spirit of the invention as claimed.

In the accompanying drawing the preferred form of the clamping ring or sleeve has been shown.

In said drawing

Referring to the figures by characters of reference, A designates a member of a hose coupling into which one end of a hose B is adapted to be inserted, this coupling generally being provided with any suitable arrangement of beads C against which the hose can be pressed for the purpose of making a tight connection between the parts. A packing ring D can be seated in the member so as to constitute an abutment for the hose and both the packing ring and the adjacent portion of the hose are adapted to receive and to be gripped by the internal fastening ring or sleeve constituting the present invention.

Figure 1:
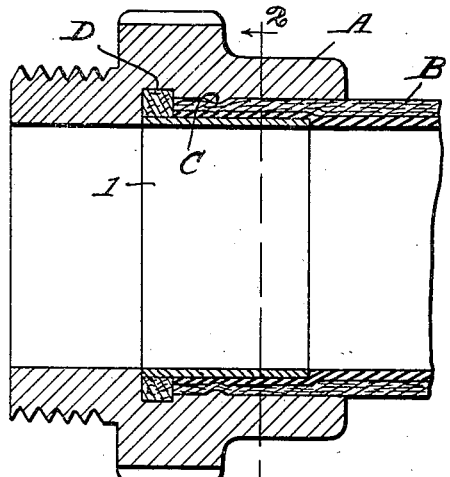
Figure 1 is a section through a member of a hose coupling and a portion of a hose therein, the parts being held assembled by a clamping ring or sleeve such as constitutes the present invention.
Figure 2:
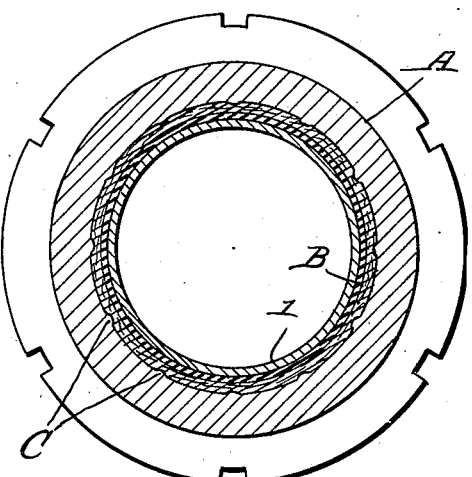
Figure 2 is a section on line 2—2, Figure 1.
Figure 3:
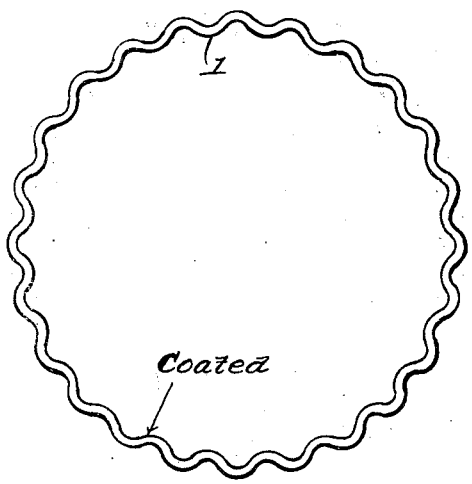
Figure 3 is an elevation of the ring prior to its application to the coupling.

As before stated this sleeve, which has been indicated at 1, can be made of a substance having the requisite rigidity but which cannot be satisfactorily stretched. In forming the ring the same is made waved throughout its circumference, the waves or corrugations being extended from edge to edge of the sleeve or ring as clearly indicated in Fig. 3. The overall diameter of the ring in its initial or waved form is slightly less than the interior diameter of the hose B.

Figure 4:
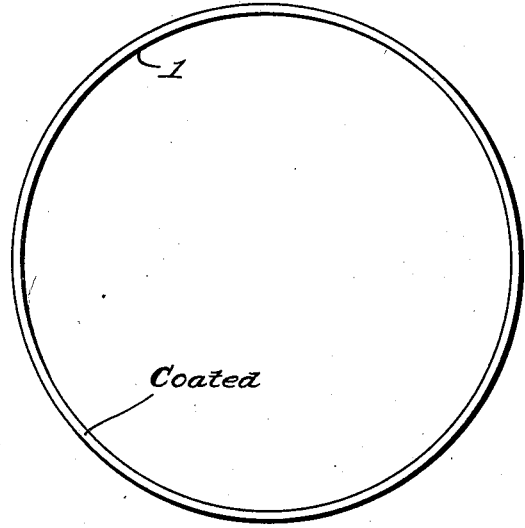
Figure 4 is a view similar to Fig. 3 showing the ring after it has been smoothed out in the engaged hose.

After the hose has been inserted into the coupling member A, the ring 1 is placed therein. Thereafter, by means of an expanding tool of the usual or any preferred type, the waves or corrugations in the ring are smoothed out so that the ring is brought substantially to the smooth circular shape shown in Fig. 4. That portion of the metal which is displaced radially by the action of the expanding tool will increase the overall diameter of the ring so that when the ring is brought to its ultimate shape as shown in Fig. 4, it will have compressed the engaged portion of the hose tightly against the inner surface of the coupling member A so that the parts will be held assembled with the same degree of security as where an ordinary expansible brass ring is employed as in the past.

As the metal of the ring is merely smoothed or flattened out by the expanding tool and little if any stretching is effected, the grain of the metal is in no wise changed and no fractures are likely to be produced. Consequently it is possible to coat the ring before it is used and thereafter, during the application of the ring by the use of an expanding tool, the coating material will not become ruptured or chipped and, as a result, the ring will be fully protected from the action of water which might otherwise rust it.

A further important advantage in the present structure resides in the fact that it provides a surplus of material in the ring which permits enlargement of the ring without undesirable stretch, the thickness of the ring consequently remaining uniform throughout the extent of the article, and the danger of buckling by the ring after it has been applied being eliminated. Thus moisture will be prevented from seeping between the ring and the hose and causing mildew and consequent rot.

It is to be understood that the terms "ring" and "sleeve" are used synonymously herein and that the width of the fastener can be made to suit the requirements.

The coating on the ring can be of zinc or any other rust-resisting material.

By reason of the design of ring as illustrated, it is evident that less power is required to install the ring by rounding it out than is required to install the conventional ring in which the metal has to be stretched about ten per cent in the process of installation. Rings of this improved design may be installed with an expander operated by a small electric motor on the lighting circuit.

What is claimed is:

1. A fastening ring for insertion in that portion of a hose seated within a coupling member and for expansion within the hose to clamp it upon the clamping member, said ring comprising an endless sleeve straight from edge to edge and having corrugations extending along straight lines from edge to edge and positioned for radial displacement when subjected to the action of an expanding tool, thereby to provide a cylindrical sleeve of increased diameter sufficient to clamp the hose to the coupling member, without substantial stretch of the material of the sleeve.

2. A fastening ring for insertion in that portion of a hose seated within a coupling member and for expansion within the hose to clamp it against the clamping member, said ring comprising a circular sleeve straight from edge to edge of a substantially non-stretchable material having a non-stretchable protective coating, said ring having corrugations extending along straight lines from edge to edge and positioned for radial displacement when subjected to the action of an expanding tool, thereby to provide a cylindrical band of increased diameter sufficient to clamp the hose against the the surrounding coupling member without substantial stretch of the material of the ring and without fracturing the coating material.

PHILIP L. WORMELEY.